June 25, 1963 R. KIRCHER ET AL 3,095,267
PROCESS FOR PRODUCING ALKALINE EARTH METAL BROMITES
Filed June 23, 1959 3 Sheets-Sheet 1
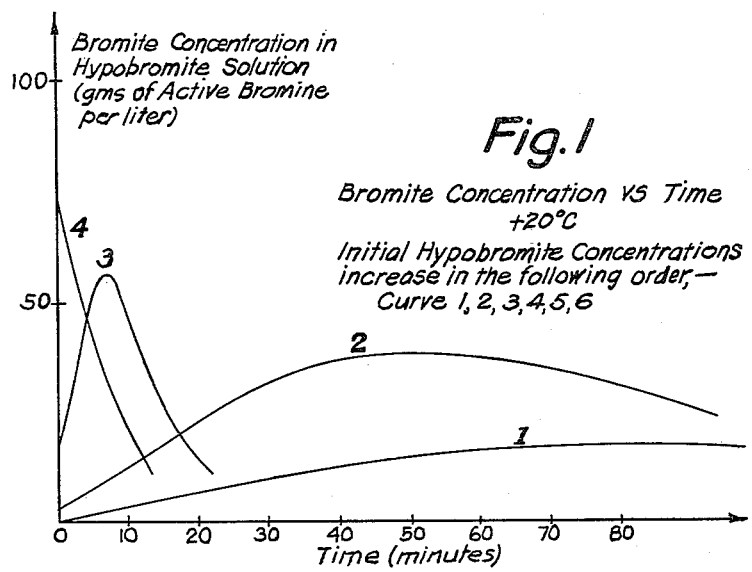
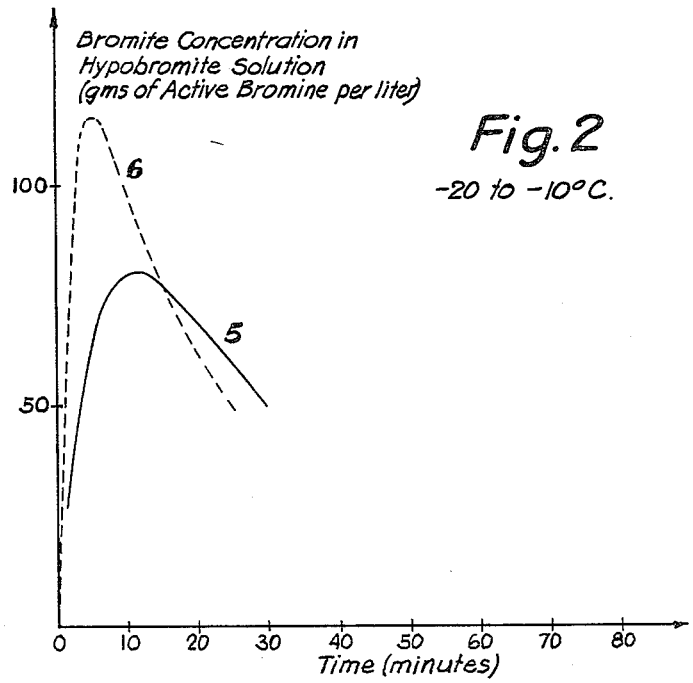
INVENTORS
RENÉ KIRCHER
ROBERT PÉRIAT
BY Toulmin & Toulmin
ATTORNEYS

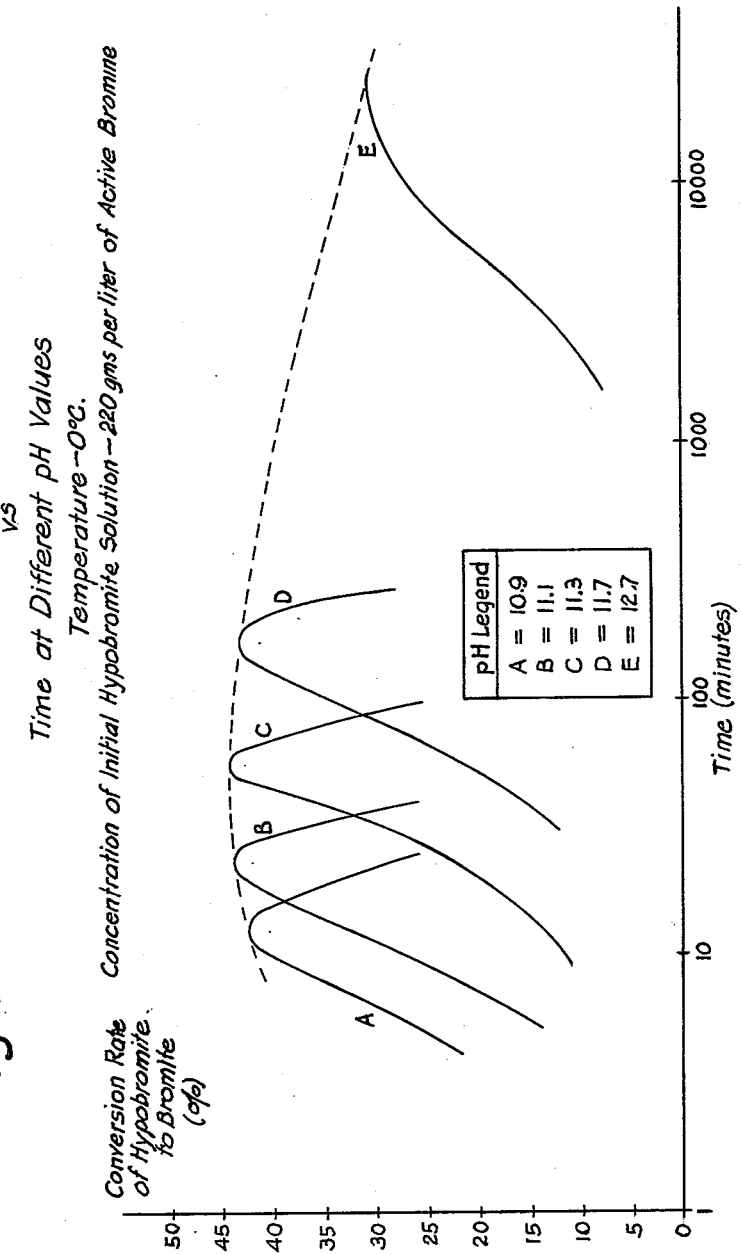

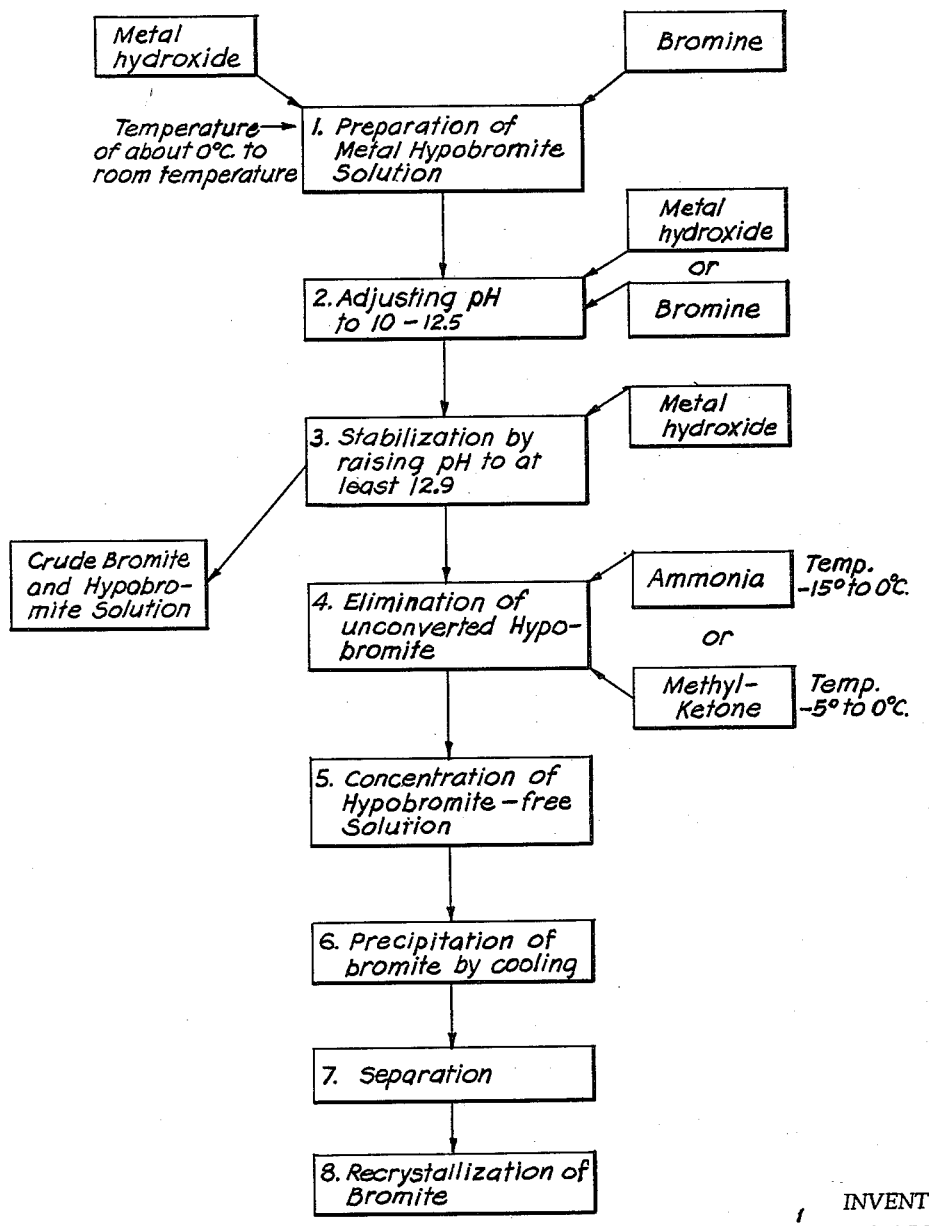

United States Patent Office 3,095,267
Patented June 25, 1963

3,095,267
PROCESS FOR PRODUCING ALKALINE EARTH
METAL BROMITES
René Kircher, Argenteuil, and Robert Périat, Chaville,
France, assignors to Societe d'Etudes Chimiques pour
l'Industrie et l'Agriculture, Paris, France
Filed June 23, 1959, Ser. No. 822,233
Claims priority, application France June 25, 1958
4 Claims. (Cl. 23—85)

This invention relates to the alkali metal and alkaline earth metal salts of bromous acid and to a process for producing the same.

This invention is an improvement over co-pending application, Serial No. 654,041, filed April 19, 1957, both of said applications being owned by a common assignee.

It is an object of our invention to produce new oxidizing agents in the form of certain solid, crystalline salts of bromus acid which are easy to transport, and from which aqueous solutions as well as solutions in anhydrous organic solvents and in aqueous mixtures with organic solvents can be prepared that have new and specific oxidizing properties.

It is another object of our invention to provide a process for producing alkali metal and alkaline earth metal salts of bromus acid, in solid crystallized form for use as the source for the aforesaid oxidizing as well as brominating agents.

It is well known in the oxidation art that the oxyacids of halogens, i.e. of chlorine, bromine, and to a lesser degree iodine, and the salts of these haloxy acids can be used as oxidizing agents. In particular, the hypochlorites, chlorates, perchlorates, and in a lesser degree the chlorites, hypobromites and bromates, and also the iodates have been used for these purposes. However, of these substances, the more easily crystallizable chlorates are relatively difficult to handle due to the danger of explosions, and of the hypochlorites, hypobromites and hypoiodites, only the former is known to exist in a crystalline form, which, however, is relatively unstable. Hitherto, bromus acid and bromites have been considered as capable of existing only in very diluted aqueous solutions. It is also known that hypobromus acid is a much more powerful brominating agent than bromine, and that bromites have a higher oxidizing power than, for instance, bromates. More particularly, hypobromites and bromites oxidize, for instance, arsenites in the cold, an oxidation reaction which cannot be achieved with bromates (supplement to Mellor's Comprehensive Treatise on Inorganic and Theoretical Chemistry, suppl. II, part I, published by Longman's, Green & Co., page 753 (1956)).

Various authorities have shown that solutions of alkali hypobromites when subjected to suitable conditions evolve gradually to a condition wherein the hypobromite must be assumed to be partially converted to the corresponding bromite. The bromites thus detected, however, have only been obtained heretofore in highly dilute solution in mixture with the bromide, bromate and hydroxide of the alkali metal, as well as extraneous salts utilized as buffer compounds. Solid bromites have never been heretofore separated, and hence no description of their properties is to be found in the literature on the subject.

The reason is, that even in those cases where conditions were most favorable for the conversion process, other researchers had never succeeded in obtaining bromite concentrations higher than 20 grams of active bromine per liter (active bromine present in a solution in the form of bromite, being defined as the weight of bromine releasable from one liter solution).

The investigators failed to concentrate the dilute solutions obtained or separate bromite in the solid state. There was, incidentally, no way of telling in advance that the concentrated solutions and/or solid bromite would be stable enough to make it possible to separate them.

We have now succeeded in producing alkali metal bromite solutions of higher concentrations, and in preparing from such solutions, crystallized alkali metal bromites.

We have further discovered that alkaline earth bromites can be prepared in a similar manner as the alkali metal salts. The existence of these compounds has never been mentioned in the literature of which the applicants are aware, whether in solution or in solid form.

The usefulness of crystallized alkali metal bromites and alkaline earth metal bromites as oxidizing agents is obvious to a chemist from considerations of the position of bromine in the periodic table of Mendeléeff. Basically, it is often desirable to use the more strongly oxygenated oxidizing agents for many oxidation processes, i.e. chlorites or even chlorates instead of hypochlorites. On the other hand, it would be more desirable to have stabler, less explosion-promoting endothermic compounds than are constituted by the —$ClO_2'$ and especially the —$ClO_3'$ ion, which is a well-known component in many explosive mixtures. Instead of, therefore, preferring to use chlorate or chlorite instead of hypochlorite, it would obviously be more desirable to use bromites or bromates instead of chlorites or chlorates since, due to the larger atom volume of the bromine atoms, and for other chemical and particularly "steric" reasons, the bromite ion lattice in a metal bromite crystal promises to be relatively stable.

On the other hand, it is known that bromates are the least stable of all halates, so that bromite salts appear the most desirable products if they can be produced on an industrial scale and in such stable crystals that they can be easily transported. The preparation of aqueous solutions by dissolving determined amounts of the dry salt is, of course, much easier and much more accurate than the chemical production in situ of such solutions in any known manner, leaving the exact concentration and the purity of the attained solution largely to chance.

Since the general conditions for preparing concentrated solutions both of alkali and alkaline earth metal bromites are broadly the same, these general conditions will be disclosed hereinafter without the particular cation contemplated being specifically pointed out. To clarify the description however, some typical numerical data will be given by way of illustration, which relates to sodium, it being understood that the sodium cation is selected for purposes of example only.

The hypobromite solution stock subjected to the conversion conditions can be prepared in any suitable conventional way, as by reacting bromine with an aqueous alkali hydroxide solution, reacting a hypochlorite with a bromide, or by electrolysis, etc. The feasibility of preparing concentrated bromite solutions is predicated on the following conditions which we have discovered.

First, the higher the starting concentration in the initial solutions the higher will be the bromite concentration in the resulting solution. In other words, when operating under certain predetermined conditions to be specified below, the use of initially concentrated hypobromite solutions does not cause the decomposition of the bromite, contrary to what was believed in the art.

Secondly, the conversion rate or yield of the hypobromite-to-bromite conversion depends on a number of physico-chemical factors, control of which makes it possible to improve greatly on the yields obtained by earlier workers.

We have discovered that, in contrast with what had to be expected concerning the stability of bromites, it is feasible to start from hypobromite solutions of higher concentration than those heretofore used. It has further been found that the conversoin yield of hypobromite to bromite can be increased by observing certain predetermined pH and temperature ranges.

The process according to our invention of producing concentrated solutions of alkali and alkaline earth metal bromites from the respective hypobromites, comprises, as schematically represented in the accompanying flowsheet (FIGURE 4), the steps of (a) Preparing an aqueous solution of a hypobromite, the cation of which is a metal ion selected from the group consisting of the alkali metal and alkaline earth metal ions, in such amounts that the solution contains at least 50 grams per liter of available bromine;

(b) Adjusting the initial pH of the aqueous hypobromite solution to a pH of at least about 10 or preferably in a range of 10.5 to 12.5, so as to start spontaneous conversion of the hypobromite to the corresponding bromite, preferably by adding to the hypobromite solution bromine when the initial pH was higher, or the hydroxide of the same cation as is present in the hypobromite if the initial pH was lower than the aforesaid range;

(c) Maintaining the operating temperature of the solution below that temperature at which the bromite would be decomposed i.e. at room temperature or preferably lower, at about 0° C. and down to −15° C.; until obtaining a primary solution containing bromite and hypobromite wherein the conversion of hypobromite-to-bromite has approximately attained the maximum corresponding to the respective pH and temperature;

(d) Adding to the primary solution a metal hydroxide, the cation of which is preferably the same as the cation of the hypobromite, in such amounts as to raise the pH of the solution to at least 12.9, so as to stop the conversion of hypobromite-to-bromite at the aforesaid maximum, and simultaneously to stabilize the resulting secondary bromite-containing solution. This maximum will be attained after a time interval of about 15 to 120 minutes depending on the various above-listed factors which will be discussed in more detail hereinafter.

In order to obtain a final concentrated bromite solution practically free from hypobromite, the above process steps should be succeeded by the step of (e) Adding a reducing agent substantially inert to bromite to the second bromite-containing solution so as to decompose any unconverted hypobromite.

More particularly, this step (e) should consist in adding to the secondary solution an aqueous ammonia solution in substantially stoichiometric proportion to the said amount of unconverted hypobromite in said secondary solution and maintaining the temperature at a level up to 0° C., and preferably between −15° and 0° C., so as to decompose substantially exclusively the unconverted hypobromite contained therein, while leaving the bromite substantially unaffected.

The hypobromite conversion reaction can be represented by the following two equations:

(1) $\quad 2MeBrO \rightarrow MeBrO_2 + MeBr$ (2) $\quad MeBrO_2 + MeBrO \rightarrow MeBrO_3 + MeBr$ wherein Me represents an alkali or alkali-earth metal equivalent. The bromite $MeBrO_2$ which forms according to reaction (1) tends to react with the hypobromite $MeBrO$ according to reaction (2). However, in order that the over-all yield of the hyprobromite-to-bromite conversion reaction (1) be high in the initial solution having a given hyprobromite concentration, the aforesaid definite ranges as to pH between 10 and 12.5 and temperatures below room temperature down to −15° C. must be observed. In particular, the solutions should be maintained at a temperature not higher than 0° C., it being understood that if higher temperatures are used, bromite may be obtained but, for reasons to be explained further below, the maximum yield will be difficult to obtain owing to the great velocity of the aforesaid reactions.

The pH value in the initial solutions should preferably be also held within the aforesaid predetermined limits. Thus, for solutions initially containing 200 to 300 grams per liter active bromine in the form of sodium hypobromite, the pH should preferably be within a range of from 10.5 to 11, for higher concentrations it should be higher, up to 12.5. The pH adjustment should preferably be performed by directly adding an excess of one or the other of the reagents used in preparing the hypobromites, i.e. without using buffer ions of foreign character. The absence of foreign ions in the solution appreciably simplifies the final separation step of the solid bromite.

Investigation of the spontaneous conversion of dilute hypobromite solutions with time, as performed by earlier workers, has only shown that the bromite concentration passes through a peak value as a function of time. Our work has shown the additional fact that the lower the initial concentration, the lower the rate of conversion to bromite in the solutions at a given temperature. This shall be explained hereinafter in greater detail in connection with the accompanying drawings in which FIGURE 1 shows the changes in bromite content against time of aqueous sodium hypobromite solutions, at a temperature of +20° C., FIGURE 2 shows the same changes at temperature between −20° C. and −10° C. FIGURE 3 illustrates the conversion rate of aqueous hypobromite solutions of given initial concentration at 0° C. and at various pH values as a function of time. The curves 1, 2, 3 and 4 of the graph designated as FIGURE 1 in the accompanying drawings illustrate, against time, the changes in bromite content (in terms of grams active bromine per liter) in solutions having respectively increasing initial hypobromite concentrations, the four curves all being plotted for an initial temperature of substantially 20° C. The curves 1, 2, 3, 4, in FIGURE 1, and 5 and 6 in FIGURE 2 correspond to the following initial concentrations of active bromine per liter of solution of sodium hypobromite.

| Curve: | Grams |
|---|---|
| 1 | 50 |
| 2 | 100 |
| 3 | 150 |
| 4 | 200 |
| 5 | 200 |
| 6 | 300 |

Moreover, a decrease in temperature reduces the rate of conversion of the solutions and makes it possible, therefore, to use initial solutions of higher concentration. This is illustrated by curve 5 in FIGURE 2, which is plotted for a solution having the same initial concentration as that of curve 4 in FIGURE 1, but at an operating temperature within the range −20° C. to −10° C. instead of +20° C. for FIGURE 1.

It is seen that at +20° C. the peak concentration value can practically not be attained since decomposition sets in and proceeds too rapidly. On the other hand, when working below −10° C., the maximum bromite concentration is obtained in a period of about 10 minutes.

Curve 6 (FIGURE 2) is similar to curve 5 but for a much higher hypobromite concentration in the initial solution. This curve shows that temperature reduction makes it possible to use initial solutions of much higher hypobromite concentrations, such that if used at ordinary temperature any bromite formed therein would instantly break down.

We have found that with the above specified conditions, i.e. at temperatures of less than 0° C. and with an initial pH value in the range of 10.5–11.0, a conversion yield of hypobromite-to-bromite could be achieved of about 42 to 45% with the use of starting solutions initially containing 200 to 300 grams of active bromine per liter in sodium hypobromite form.

It has further been found that, for satisfactory results, the initial pH value of the solution should be selected proportionately higher as the hypobromite concentration in said initial solution is higher. However, the pH value should still be kept within the above-mentioned optimal range for a given range of concentrations, when the remaining factors, i.e. temperature and conversion time or rate, are held constant.

We have further found that, for a given concentration of hypobromite in the aqueous solution, and for a given temperature, the maximum conversion rate of the hypobromite to bromite is a function of the pH value of the solution. Curves A, B, C, D and E of FIGURE 3 show, as a function of time the hypobromite-to-bromite conversion rates of a number of solutions each containing initially about 220 grams per liter of active bromine in the form of hypobromite, temperature being held constant at 0° C. in all five cases. The curves correspond to the following pH values:

A _____ 10.9
B _____ 11.1
C _____ 11.3
D _____ 11.7
E _____ 12.7

These curves reveal clearly that the maxima of the conversion rates attainable in each of the aforesaid five cases vary from each other, and a curve connecting these maxima drawn as a dashed line in FIGURE 3 shows itself a maximum which corresponds to a pH of about 11.3.

By studying the conversion process in initial solutions having varying initial hypobromite concentrations, we have established that the maximum conversion yield of hypobromite-to-bromite increases as the hypobromite concentration in the initial solution is increased. It is, accordingly, doubly advantageous to use high-concentration initial solutions, since this increases the bromite concentration of the final solution in which conversion has reached the highest attainable rate under the given conditions of chemical equilibrium, both because of the higher active bromine content in the initial solution and owing to the increased hypobromite-to-bromite conversion yield achievable.

As indicated above, the rate of the conversion process of a hypobromite solution at a given temperature is increasingly rapid as the initial concentration is higher. In order to prevent a practically instantaneous breakdown of the bromite formed from a highly concentrated hypobromite solution, it is therefore necessary properly to adjust the velocity at which the conversion reaction proceeds by controlling the remaining two factors, i.e. temperature and pH value, on which said velocity depends; thus a decrease in temperature slows down the conversion process and an increase in the initial pH has a similar effect.

In accordance with the above, conversion yields of 50% to 55% have been obtained, for example, by using sodium hypobromite solutions containing about 500 grams per liter active bromine maintained at an operating temperature of about 0° C., with the initial pH of the solutions in the range of 11-12. The maximum bromite concentration is attained after a time that increases from a few minutes to two hours as the pH value is increased from 11 to 12.

In addition to their high bromite concentrations, the solutions thus obtained have yet another advantage over the solutions prepared from less concentrated initial solutions, inasmuch as they contain relatively less hypobromite, thereby facilitating an ultimate separation of the pure, solid bromite. It should be understood that after the conversion process the active bromine is present in the solutions in the forms of bromite, hypobromite and bromate, with the relative proportions between the three compounds being approximately as follows when using initial sodium hypobromite solutions at 500 grams active bromine per liter: Per 100 parts of active bromine, 50 parts occur as bromite, 25 as hypobromite and 25 as bromate.

When using solutions initially containing from 200 to 300 grams per liter active bromine, the corresponding figures are 40, 40 and 20 parts, respectively.

In order to stop the conversion process at the point where the bromite concentration is at its peak value, the solutions are stabilized by suddenly raising their pH value through addition of a suitable amount of an aqueous solution of the alkali metal hydroxide or alkaline earth metal hydroxide having preferably the same cation as the hypobromite used, e.g. NaOH in the case of sodium hypobromite. The unconverted hypobromite is then eliminated by means of a suitable reducing agent substantially inert to the bromite. For this purpose, ammonia may, for example, be used in substantially stoichiometrical amount so as to produce the reaction

$$3NaBrO + 2NH_3 \rightarrow N_2 + 3NaBr + 3H_2O$$

In this case the reduction should preferably be performed at a sufficiently low temperature to improve the specific action of ammonia on the hypobromite and avoid as far as possible simultaneous breakdown of the bromite. Thus, the reaction may be conducted in the temperature range from $-15°$ C. to $-10°$ C.; if these conditions are observed, the amount of bromite that breaks down is always less than 10% of the total quantity of bromite present in the solution.

As a general rule, when using initial solutions having as high as possible a hypobromite concentration, highly concentrated bromite solutions are obtained wherein the proportion of unconverted hypobromite is relatively low. This is an especial advantage in connection with the subsequent step involving elimination of the hypobromite.

By applying the above teachings, we have prepared alkali metal and alkaline earth metal bromite solutions of sufficiently high concentration to enable the bromites to be separated in their crystalline state. This has been done without requiring the handling of large volumes of solution.

One advantage of aqueous alkali metal bromite solutions resides in the fact that they have oxidizing power in alkaline medium, while the known chlorite solutions oxidize only in acid medium which latter fact is often a serious drawback.

We have also prepared solutions of the alkali metal bromites, in particular of sodium bromite and potassium bromite, in such anhydrous organic solvents as dimethylformamide, pyridine, and tertiary butyl alcohol. These bromites are only weakly soluble in these organic solvents, however, the resulting anhydrous solutions are useful for carrying out the oxidation of organic substances which are themselves insoluble in water, or require an anhydrous medium.

These organic bromite solutions are prepared by dissolving a solid, crystalline alkali metal bromite prepared by the process according to our invention, in the respective anhydrous organic solvent.

As regards alkaline earth bromites, as already indicated the same general conditions as for preparing solutions of alkali bromites are applicable, the various factors controlling the conversion yield acting in the same sense for alkaline earth solutions as for alkali solutions. These solutions therefore are produced by using starting solutions having the highest possible concentrations in alkaline earth metal hypobromite, obtained by any suitable known process. Thus, advantageous results have been obtained, for example, using starting solutions of barium hypobromite containing 200 to 220 g./l. active bromine and solutions of calcium hypobromite containing 300 to 330 g./l. active bromine. It will be evident that the particular pH and temperature conditions to be used in the conversion process depend on the particular cation involved.

Just as with alkali metal bromites, the separation of alkaline earth metal bromites in solid form can be effected by crystallization; the operating conditions again depend on the cation involved since different bromites have different degrees of solubility. The particular operating conditions are illustrated by specific numerical data in the examples to follow.

The alkaline earth metal bromites may be used to advantage for the preparation on an industrial scale of the corresponding alkali metal bromites, the latter being obtained by double decomposition reaction between an alkaline earth metal bromite and, for instance, a sodium salt such as the sulfate, carbonate or the like, or another suitable alkali metal salt. Also, pure sodium bromite permits to prepare easily organic solutions thereof in anhydrous organic solvents which solutions are useful for organic oxidation process as has been explained hereinbefore.

Some examples will now be given for purposes of illustration but not of limitation, of the preparation of crystallized bromites as well as other examples illustrating the particular pH and temperature conditions suitable for the production of concentrated solutions of the respective bromites.

Example I

To one liter of an aqueous sodium hydroxide solution containing 308 grams (g.) NaOH, bromine is gradually added in a substantially stoichiometrical proportion to produce sodium hypobromite. The solution is cooled during the addition of bromine. After 620 g. bromine have thus been added, the pH of the solution is about 11.4. The resulting solution contains 510 grams per liter (g./l.) active bromine. The temperature is then maintained at about 0° C. for 50 minutes and there is then obtained a solution in which 53.5% of the total oxidizing capacity is in the form of sodium bromite corresponding to a sodium bromite concentration of 273 g./l. in terms of active bromine.

To stabilize the solution there are added 65 cc. of sodium hydroxide at 20-N concentration for every liter of the solution. The residual unconverted sodium hypobromite is then eliminated by adding 93.5 ccs./liter of ammonia solution at 5-N concentration and cooling so as to hold the temperature within the approximate range of −15 to −10° C. The resulting solutions have, for instance, the following composition by weight:

| | Percent |
|---|---|
| $NaBrO_2$ | 5.8 |
| $NaBrO_3$ | 2.65 |
| NaBr | 35.7 |
| NaOH | 4.0 | corresponding to a sodium bromite content of 210 g./l. in terms of active bromine.

The solution is then concentrated by evaporation of part of the water in vacuo at a temperature of about 10 to 15° C., which results in the precipitation of sodium bromide and sodium bromate. The solution is filtered at ambient temperature (about 20° C.) to separate the precipitate. The filtrate composition is the following, in percentages by weight:

| | Percent |
|---|---|
| $NaBrO_2$ | 18.8 |
| $NaBrO_3$ | 1.0 |
| NaBr | 23.5 |
| NaOH | 13.0 | corresponding to a bromite content of 802 g./l. in terms of active bromine.

This solution is then cooled from 20° C. to 0° C. and a precipitate is separated by filtration having the following composition after the impregnating mother-liquor has been drained off: $NaBrO_2.3H_2O$ 69.7%, $NaBr.2H_2O$ 28.2% and $NaBrO_3$ 2%.

On cooling, 100 grams of solution at 20° C. yield about 27 grams of a solid of the above composition, corresponding to a 71.5% yield of bromite for the precipitate.

The impure solid is recrystallized in a N/10 sodium hydroxide solution using the quantity of solution just sufficient to dissolve the solid. The resulting product titers 99.6% $NaBrO_2.3H_2O$ and only contains traces of bromate.

Example II

The separation of sodium bromite from the crystallized mixture obtained by Example I is accomplished by the following stages: After elimination of the hypobromite, the solution, now containing sodium bromite, sodium bromide and sodium bromate, is concentrated until it is saturated in bromite. This concentration is effected, for example, by evaporation of water under reduced pressure, preferably at a temperature below 30° C., and the sodium bromide and bromate that precipitate are removed by filtration or a similar separating step. The resulting solution is saturated in all three sodium salts, bromite, bromide and bromate. Depending on the free sodium hydroxide content in the solution, the sodium bromite concentration at saturation may attain approximately 700 to 850 g./l. active bromine at 20° C.

We have found that, by cooling a solution saturated in bromite, bromide and bromate and containing free soda, a solid precipitate forms having a much higher bromite content than in the mother solution. For example, a solution having the following composition in g. per 100 g. of solution:

| | G. |
|---|---|
| $NaBrO_2$ | 20.15 |
| $NaBrO_3$ | 0.95 |
| NaBr | 20.75 |
| NaOH | 15.40 |

The Balance being water.

which corresponds to 835 g./l. active bromine in bromite form, is cooled from 20° C. to 0° C., thereby precipitating a solid which comprises: 72.8% $NaBrO_2.3H_2O$ and 22.3% $NaBr.2H_2O$, and small amounts of bromate. Thus, the solid contains 66% of the bromite present in the solution and, after separation of the precipitate the remaining solution may be recycled.

The impure solid thus obtained can then be recrystalized in an aqueous soda solution to yield $NaBrO_2.3H_2O$ in pure form.

Example III

One liter of a solution containing 148.5 g. NaOH and 300 g. bromine is prepared under energetic cooling to 0° C. The solution has a pH 10.7 and is maintained at 0° C. for 15 minutes. A solution is then obtained, wherein 45% of the total oxidizing power is in the form of sodium bromite. The bromite concentration attains 135 g./l. in terms of active bromine.

This solution is then stabilized by adding about 5 cc./liter of 20–N soda solution, thereby raising the pH to about 12.9. The sodium hypobromite remaining in solution is removed by adding 5-N ammonia solution at about 0° C., using a stoichiometric amount of ammonia which respect to the residual hypobromite. The bromite is then separated as in Example I.

The pure solid, sodium bromite prepared as described in Examples I to III, was found by us to consist of yellow crystals. The crystals consist of the bromite hydrate $NaBrO_2.3H_2O$ and from this the anhydrous bromite $NaBrO_2$ was produced, e.g. by dehydration in vacuo. The anhydrous bromite thus produced was quite definitely identifiable under X-ray examination, as evidenced by the following tabulation of interplanar spacings $d$, expressed in Angstrom units:

| d | 4.38 | 3.66 | 3.20 | 2.95 | 2.90 | 2.88 | 2.52 | 2.35 | 2.07 |
|---|---|---|---|---|---|---|---|---|---|
| I | 25 | 9 | 11 | 19 | 100 | 10 | 3 | 60 | 6 |
| d | 1.97 | 1.90 | 1.84 | 1.82 | 1.56 | 1.51 | 1.48 | 1.44 | |
| I | 2 | 2 | 8 | 30 | 1 | 2 | 2 | 21 | |

In the above table there is indicated adjacent each interplanar spacing value, the corresponding microdensitometrical intensity measurement I for the corresponding pattern line in a powder-radiocrystallography test.

The anhydrous sodium bromite can be stored under vacuum for several months at room temperature and protected against direct light by using brown storage flasks or the like. Sodium bromite containing 3 moles of crystal water can be stored under vacuum at room temperature for about a month suffering only a slight dehydration due to partial loss of crystal water to the vacuum. It appears that the higher the degree of purity of the bromite, the greater its stability. A salt consisting of mixed crystals having the following composition:

| | Percent |
|---|---|
| $NaBrO_2 \cdot 3H_2O$ | 94.5 |
| $NaBr$ | 5.0 |
| $NaBrO$ | --- |
| $NaBrO_3$ | 0.3 | shows a diminution of its bromite content by about 12.4% within one month.

Normally, however, it will be preferred to store highly concentrated aqueous or saturated organic bromite solutions in order to avoid the necessity of evacuation.

From the pure sodium bromite, bromite solutions may be obtained which do not contain any other bromine-containing salt nor any other foreign ion. Such solutions which have never been prepared heretofore can be adjusted most accurately to a desired content of oxidizing and/or halogenating activity, and constitute effective oxidizing and halogenating reagents for which the use of chlorine compounds was necessary in the past. The concentration of such solutions moreover may be varied over a wide range. In an alkaline medium the solutions are stable and may be stored for long periods. Thus, it has been found that the titer of a solution containing 157 g./l. active bromine in the form of sodium bromite did not noticeably vary over a month, although the solution was stored under normal illumination and at ordinary temperature. It was also found that very highly concentrated solutions (790 g./l. active bromine in sodium bromite form) suffered a reduction in titer of less than 10% in four months storage, when stored in the dark at about 5° C.

*Example IV*

Lithium bromite, $LiBrO_2 \cdot H_2O$, can be prepared in the form of greenish yellow crystals from concentrated solutions of this salt. These solutions are obtained by conversion of lithium hypobromite solutions containing 320 to 330 g./l. active bromine wherein the initial pH is adjusted to 10.5 to 10.7, operating at about 0° C. Under these conditions, the conversion rate of lithium hypobromite to bromite is of the order of 50 to 53%.

*Example V*

Potassium bromite is produced by evaporating solutions prepared by conversion of potassium hypobromite solutions containing 300 g./l. active bromine with an initial adjusted pH value of 11.2, operating at about −10° C. The conversion yield in this case is about 33%.

*Example VI*

An aqueous suspension of barium hydroxide is prepared by adding 304 g. $Ba(OH)_2$ to 1175 g. water. 284 g. bromine are then added gradually while agitating and cooling the suspension to about 0° C. A barium hypobromite solution is thus obtained having a pH of 11.2 and containing about 221 g./l. active bromine.

This solution is maintained at about 0° C. for 58 minutes, whereupon about 55% of the hypobromite content is found to have been converted to barium bromite. $Ba(OH)_2$ is then added, e.g. in aqueous solution, in an amount of 16 g. per liter to arrest the conversion by raising the pH of the bromite solution to 12.9. The remaining unconverted barium hypobromite is then eliminated by adding a stoichiometrical quantity of 5-N ammonia solution while maintaining the temperature at about −5° C.

During the conversion process a small amount of barium bromate is precipitated. The liquid is filtered to separate the precipitate, and a solution is obtained having, for instance, the following composition by weight:

| | Percent |
|---|---|
| $Ba(BrO_2)_2$ | 3.85 |
| $Ba(BrO)_2$ | 0.4 |
| $BaBr_2$ | 24.2 |
| $Ba(OH)_2$ | 1.15 |

The balance being water.

This solution is concentrated under reduced pressure sufficiently low to evaporate water at the surrounding temperature of about 20° C., until the weight of the solution attains, for instance, 51.5% of the initial weight. The concentrate is then cooled to 0° C. and a solid is precipitated which, after removal of the impregnating solution, has approximately the following composition by weight:

| | Percent |
|---|---|
| $Ba(BrO_2)_2$ | 64.6 |
| $Ba(BrO_3)_2$ | 3.1 |
| $Ba(OH)_2 \cdot 8H_2O$ | 32.3 |

In this way, about 80% of the barium bromite initially present in the solution can be precipitated.

*Example VII*

A barium hypobromite solution is prepared by suspending 270 g. $Ba(OH)_2$ in one liter of water and adding bromine in an amount corresponding to 97% of the theoretical quantity required for the formation of hypobromite. The resulting solution titers 220 g./l. active bromine, which is close to saturation, and has a pH of 13.6. The solution is adjusted to pH 11.3 by adding an appropriate amount of bromine and the solution is then maintained at a temperature of about 0° C. for about 70 minutes. Thereafter, about 57.2% of the initial hypobromite have been converted into barium bromite and the solution contains 125.8 g./l. active bromine in the form of $Ba(BrO_2)_2$. This solution is then treated in a similar manner to the solution obtained in Example VI.

*Example VIII*

A calcium hypobromite solution is prepared containing 320 g./l. active bromine. The solution is adjusted initially to pH 10.65 by adding bromine and is held at about 0° C. After about 40 minutes of the conversion process, the solution contains, e.g., 185.6 g. per liter of active bromine as calcium bromite, corresponding to a conversion rate of 58% in terms of hypobromite. This solution is then stabilized by adding $Ca(OH)_2$, preferably in aqueous solution, and then removing the unconverted calcium hypobromite in the manner described analogously in Example II.

*Example IX*

A calcium hypobromite solution having the same concentration as that used in Example VIII is adjusted to an initial pH value of 10.9 and maintained at about 0° C. Under these conditions it is found that after two hours, 57% of the hypobromite initially present are converted to calcium bromite.

While the preparation of a practically pure alkaline earth metal bromite according to the process of our invention described hereinbefore in Examples VI–IX, comprises the steps of (1) Preparation of the hypobromite solution.
(2) Maximally possible conversion of the hypobromite to bromite.
(3) Stabilization of the bromite in the solution.
(4) Elimination of the unconverted hypobromite.
(5) Concentration of the solution.

(6) Cooling of the solution with precipitation of bromite.
(7) Separation of the precipitate.
(8) Recrystallization of the bromite.

this process has been perfected so as to simplify considerably the mode of operation of the same and to obtain still higher conversion rates of hypobromite to bromite.

This improved process according to the invention, comprises the step of using as the starting medium for the conversion of hypobromite to bromite an alkaline earth metal hypobromite and more particularly a barium or strontium hypobromite suspension instead of the almost saturated solution thereof as used hereinbefore.

It was found that (a) Barium or strontium hypobromite exists in the solid state and possesses a sufficient stability so as not to be decomposed instantaneously to bromate and bromide;

(b) Barium or strontium hypobromite suspended in a saturated aqueous hypobromite solution will convert to bromite; and (c) The barium or strontium bromite formed from the hypobromite in the solution precipitates immediately as it is produced so as to yield directly a suspension of barium or strontium bromite.

In order to attain a conversion of hypobromite to bromite at a good yield rate, the initial pH of the suspension is adjusted to from about 10.5 to 11.5. Increased temperatures will augment the conversion velocity of the hypobromite, but the lower the pH of the suspension, the lower should the temperature be held to avoid decomposition of an unduly large proportion of the formed bromite. In practice, it is therefore preferred to operate at temperatures not exceeding about 25° C. and better still in the vicinity of 0° C.

The concentration of the solid phase in the suspension can be varied greatly, but it is preferable to work with relatively high concentrations, using, for example, aqueous suspensions containing from about 20 to 30 grams, preferably from 28 to 30 grams, of barium or strontium hypobromite per 100 grams of the suspension, in order to obtain very satisfactory conversion rates and precipitates of high bromite content.

The use of hypobromite suspensions instead of hypobromite solutions offers several advantages among which there shall be noted a higher conversion rate of hypobromite to bromite, a noticeable reduction in the volumes of liquid to be handled for producing a given amount of barium bromite, and finally an important simplification of the process, the simplified mode of operation comprising the steps of:

(1) Preparation of the hypobromite suspension.
(2) Maximally possible conversion of the hypobromite to bromite.
(3) Stabilization of the bromite in the suspension.
(4) Separation of the solid precipitate from the mother liquor; and
(5) Recrystallization of the bromite.

Three of the eight steps of the first mode of operation described can thus be eliminated. Indeed, the elimination of unconverted hypobromite, the concentration and the cooling step have become superfluous, for at the end of the conversion step the newly formed barium bromite is present in the suspension as a solid precipitate, while the unconverted hypobromite has been completely dissolved. A simple separation of the precipitate by one of the known methods such as decantation or filtration is thus sufficient to isolate the crude barium bromite salt. The composition of the latter is such that a direct recrystallization of the precipitate still having occluded mother liquor is sufficient to obtain crystals of $Ba(BrO_2)_2 \cdot H_2O$ having from 97–98% purity. If this salt is not to be employed for usages requiring higher degrees of purity, simple washing with bromite-saturated cold water will be sufficient to free the crystals from adherent mother liquor.

The improved process for producing the more difficultly soluble alkaline earth metal bromites and more particularly barium or strontium bromite permits to improve noticeably the maximally possible conversion rate of hypobromite to bromite. While according to the mode of operation described in connection with the preceding examples, the maximum rate of hypobromite-to-bromite conversion attained is in the order of 55 to 57% based on the hypobromite present in the starting solution, about 65% can be attained by the improved mode of operation just described.

Moreover, the volume of liquid or suspension that must be handled in order to obtain a given amount of, for instance, barium bromite, is much lower, firstly because the starting suspension has in itself a higher content of hypobromite, and, secondly, because the conversion rate is higher. Thus, the use of a suspension containing 28 to 30 grams of barium hypobromite per 100 grams of suspension instead of a saturated barium hypobromite solution permits to reduce by two thirds the liquid volume to be handled.

Barium bromite crystallizes with one molecule of water of crystallization and is a particularly stable compound in the solid state. It is thus particularly suited for transportation. Barium bromite crystals have been heated to 58° C. under reduced pressure for about 3 hours without noticeable decomposition. When heated to 80° C. under reduced pressure for 3 hours, about 40% of the initially present bromite is decomposed. The composition of the crystallized solid held under vacuum at 0° C. remains practically unchanged for six months and longer.

It has further been found that a saturated solution of barium bromite containing about 130 grams of active bromine per liter, remains unchanged when exposed to daylight at room temperature for at least three months.

Barium bromite is an excellent starting material for the preparation of the alkali metal bromites by cation exchange reaction, for instance, with sodium carbonate.

The improved mode of operation according to the invention described above will now be illustrated by a non-limitative example.

*Example X*

A slurry is formed by adding to 160 g. of water 600 g. of commercial barium hydroxide containing 319.2 g. of $Ba(OH)_2$. 285 g. of bromine are gradually introduced under stirring into this aqueous suspension of barium hydroxide, so as to obtain a suspension of barium hypobromite containing about 28 g. of $Ba(BrO)_2$ per 100 g. of the suspension. About 15.5 g. of bromine are then added to the suspension in order to adjust the pH of the same to 11.2. The suspension is then cooled to a temperature of about 0° C. and permitted to react for about 120 minutes at which time a maximum of about 64% of the initially contained barium hypobromite has been converted to barium bromite, $Ba(BrO_2)_2$. About 1.5 g. of solid barium hydroxide, $Ba(OH)_2 \cdot 8H_2O$, are then added for every 100 g. of the converted suspension which amount should be sufficient to raise the pH of the suspension to 12.9, whereby the barium bromite content of the suspension is stabilized.

The solid phase is then separated from the suspension by filtration and a solid crystallized mass containing occluded mother liquor is obtained which has the following composition:

| | Percent |
|---|---|
| $Ba(BrO_2)_2$ | 30.7 |
| $Ba(BrO)_2$ | 0.8 |
| $Ba(BrO_3)_2$ | 15.4 |
| $BaBr_2$ | 24.5 |
| $Ba(OH)_2$ | 1.0 |
| $H_2O$ | 27.6 |

The moist solid mass is recrystallized directly without washing, by adding water to obtain a solution saturated in barium bromite at 0° C. The undissolved barium bromate is eliminated by filtration. By slow evaporation of water at about 30° C. under reduced pressure (15–20 Torrs, 1 Torr being 1 mm. Hg) and after separation of the precipitate from the solution by decantation or filtration and subsequent washing with an aqueous saturated barium bromite solution, there is obtained a practically pure barium bromite of the following composition:

| | Percent |
|---|---|
| $Ba(BrO_2)_2.H_2O$ | 98.1 |
| $Ba(BrO_3)_2.H_2O$ | 1.0 |
| $BaBr_2$ | Traces |

*Example XI*

25 grams of strontium bromite prepared in a similar way as barium bromite in Example X are dissolved in 250 grams of 0.22-N strontium hydroxide solution. To the solution so obtained are then added 525 cm.³ of 0.02-N lithium hydroxide solution containing 10.49 g./l. of lithium carbonate. After separation of the precipitated strontium carbonate, the resulting solution is concentrated by water evaporation at room temperature until removing 96.5% of its initial weight. The lithium bromite is separated by filtration and dried in vacuo at about 0° C. to +5° C. There is obtained pale yellow crystals of lithium bromite containing 97.4% of $LiBrO_2.H_2O$.

*Example XII*

A strontium bromite solution is prepared by dissolving 30 g. of strontium bromite in 300 g. of a 0.02-N strontium hydroxide solution. 44.2 g. of a potassium carbonate solution containing 28.2% by weight of $K_2CO_3$ are added and the pH of the solution so obtained is adjusted to 12.55 by adding 0.57 g. of KOH. The precipitate of strontium carbonate is separated and the resulting solution is evaporated in vacuo at room temperature until obtaining a saturated solution of potassium bromite. This solution is cooled to about −10° C. whereby is obtained a crystalline precipitate of potassium bromite which after elimination of adherent mother liquor, is found to contain 97.5% of $KBrO_2.2H_2O$.

According to yet another mode of operating the process according to the invention, the step of eliminating unconverted hypobromite from the bromite solutions stabilized at pH 12.9 after maximum possible hypobromite-to-bromite conversion has been achieved, is improved with the object in mind to eliminate selectively the unconverted hypobromite in such a manner that the formation of bromide in the solution is largely or completely avoided, thereby reducing losses of bromine or costs for its recovery and obtain a brominated product from the unconverted hypobromite which is of commercial value and can be easily separated from the bromite-containing solution.

In the first described mode of operating the process according to the invention, the solutions in which the hypobromite-to-bromite conversion has reached its maximum, of between about 50% to 60% of the initial amount of hypobromite, are stabilized by raising the pH value and the unconverted hypobromite is then eliminated by adding to the converted solution a suitable hypobromite-reducing agent, in particular ammonia.

If sodium bromite is the bromite salt to be obtained, the elimination of hypobromite with ammonia can be formulated by the following equation:

(1)    $3NaBrO + 2NH_3 \rightarrow N_2 + 3NaBr + 3H_2O$

In the course of the above reaction, each decomposed mole of hypobromite forms one mole of bromide which remains dissolved in the bromite-containing solution.

This fact represents a serious drawback in that it constitutes a loss of bromine and correspondingly makes the production of the bromite more expensive.

When the bromite solution containing the bromide is used as an oxidizing or brominating agent, the bromide present in the solution is useless and must be considered a loss of valuable bromine. If crystalline bromite salt is to be prepared from the solution, the bromide must first be separated and afterwards treated to recover therefrom the bromine which can then be used in a new work cycle.

The last-mentioned object is attained and the above drawback of the presence of bromide in the stabilized bromite solution is largely overcome by using as the hypobromite-eliminating agent a methyl ketone capable of reacting selectively with the unconverted hypobromite in the bromite-containing solution and separating the resulting bromoform from the solution.

It is known that hypobromites in aqueous solution react with certain organic compounds such as, in particular, compounds having the general formula $$R.CO.CH_3$$

wherein R is a preferably saturated aliphatic radical in which the carbon atom linked to the —$CO.CH_3$ group must be free from strongly activated hydrogen atoms and from groups creating a steric hindrance. Substances satisfying these conditions are, in the first line, methyl ketones, in particular acetone, and secondly, organic products capable of forming methyl ketones by oxidation.

Taking again the preparation of sodium bromite as an example, the elimination of hypobromite with the aid of a methyl ketone can be formulated by the following equation:

(2)
 $R.CO.CH_3 + 3NaBrO \rightarrow R.CO.ONa + CHBr_3 + 2NaOH$

R having the definition given above.

It was found that under the conditions of pH value and temperature stated in the description hereinbefore of the first mode of operating the process according to the invention, these methyl ketones are practically inert with regard to the bromite present in the treated solution, while they react selectively with the hypobromites according to the above Equation 2.

The treatment of the solutions containing unconverted hypobromite besides bromite with a methyl ketone according to the present improved mode of operation leads to the formation of bromoform which is insoluble in the reaction medium and can easily be separated from the latter by simple decantation.

Bromoform formation takes place between hypobromite and the entire homologue series of methyl ketones; however, it is preferred to use the lower members of this series and in particular acetone, for obvious reasons of availability at lower cost. Furthermore, as can be seen from Equation 2, the methyl ketone molecule is split to yield bromoform and the corresponding salt of an organic acid which is dissolved in the reaction medium.

It is also possible to use as the hypobromite-decomposing agent those alcohols which form methyl ketones when oxidized under the reaction conditions prevailing in the process according to the invention. However, this is less advantageous, since the conversion of the alcohol to the methyl ketone consumes part of the oxygenated bromine compounds, acting as the oxidizing agent, under formation of bromide which remains in the solution, so that the amount of recovered bromine in the form of a commerically valuable product is correspondingly lower.

The use of methyl ketones instead of ammonia in the elimination of unconverted hypobromite from the bromite-containing solutions in the process according to the invention offers a number of advantages. The reaction of the methyl ketones with hypobromite is considerably less exothermic than that of the latter compounds with ammonia, and it thus becomes possible to operate at temperatures in the range of about −5° C. to 0° C. without causing a decomposition of bromite higher than 5% by weight of the total amount of bromite present in the solution.

When using ammonia, it is necessary, as has been stated further above, to operate at lower temperatures in the order of −15° C. to −10° C. in order to limit the amount of decomposed bromite to 10% of the total.

By using methyl ketones according to the present mode of operating the process of the invention, it is thus possible to eliminate the unconverted hypobromite from the bromite-containing solution with an even better selectivity, and yet at the temperatures which are normally used for the preparation of the bromites, i.e. in the range of —5° C. to 0° C. The additional cooling required when using ammonia is thus made superfluous.

In the first-described mode of operating the process according to the invention, the elimination of unconverted hypobromite is preceded by a stabilization of the bromite-containing solution by raising the pH of the latter to at least 12.9. In practicing the present mode of operation involving the use of methyl ketones, it is preferable to eliminate the hypobromite at a pH value of the solution in the vicinity of the lowest pH limit compatible with the stability of bromite, i.e. in the vicinity of pH 13. In fact, a medium of higher basicity would favor the hydrolysis of bromoform, and the yield in the latter valuable substance would decrease noticeably.

The methyl ketones are preferably used in anhydrous state or in concentrated aqueous solution in order to avoid unnecessary dilution of the bromite-containing solution. The hypobromite-decomposing agent is added in practically stoichiometrical amounts relative to the hypobromite initially present in the solution, and at a low enough speed to avoid abrupt rises in temperatures locally that might cause the decomposition of bromite.

The mode of operating the process according to the invention with the use of methyl ketones as the hypobromite-decomposing agent will now be illustrated with the aid of a few non-limitative examples.

*Example XIII*

To 2083 grams of a solution having a pH of 13 and containing 7.25 g. of NaBrO and 7.13 g. of $NaBrO_2$ per 100 g. of solution, there are added slowly 122.6 cm.$^3$ of an aqueous acetone solution containing per liter 200 g. of $CH_3.CO.CH_3$. The temperature of the solution is held at —5° C. throughout the addition of the acetone, and is then permitted to rise to about +10° C. The bromoform produced by the decomposition of the hypobromite is decanted; about 82 g. of bromoform are recovered and analysis of the remaining solution reveals that it only contains 0.69 gram of NaBrO per 100 grams of solution. Only about 3.8% by weight of the initially present bromite have become decomposed during this treatment.

*Example XIV*

To 13,869 grams of a solution having a pH of 13.3 and containing 9.25 g. of NaBrO and 6.40 g. of $NaBrO_2$ per 100 g. of solution, there are added 209 g. of dry acetone, while the temperature is held between —5° C. and 0° C. The addition is carried out so slowly that it is terminated only after 3 hours. The temperature of the solution is then raised to about +10° C. and the resulting bromoform is separated from the solution. 698 g. of bromoform are obtained, and the separated solution is found to contain not more than 0.12 g. of NaBrO per 100 g. of solution. The loss in bromite amounts to about 4.3% by weight of the total amount of bromite initially present in the solution.

*Example XV*

To 1405 grams of a solution having a pH of 13.1, and containing 6.81 g. of NaBrO and 6.56 g. of $NaBrO_2$, there are added gradually during a period of 15 minutes about 19.30 g. of methyl ethyl ketone in anhydrous state, while the temperature is held at about —5° C. After the addition of the ketone is terminated, the temperature of the solution is permitted to rise slightly to below +10° C., and the resulting bromoform is then separated by decantation. About 44 g. of bromoform are recovered, while the solution contains only less than 1.1 g. of NaBrO per 100 g. of solution; only about 5% by weight of the initially present bromite have been decomposed during this treatment.

Alkali metal and alkaline earth metal bromites may be used, for instance, in aqueous solution in the manufacture of cellulose fibre fabrics, especially cotton fabrics, and more particularly in a de-sizing treatment preparatory to the finishing operations which include scalding, or scouring, bleaching and dyeing. Scalding or scouring is a known finishing treatment described, for instance, in "Encyclopedia of Chemical Technology" by Kirk & Othmer, vol. 13, pages 868 and 869. The purpose of de-sizing or de-starching cellulose fibre fabrics is to remove from the fabric amylaceous (starchy) matters that were applied to the warp of the fabric in order to facilitate weaving. The starch impregnating the fabric interferes seriously with the penetration of the reagents, and thus renders subsequent treatments difficult to perform efficiently. It is therefore important in the interests of successful bleaching and dyeing results that the fabric be stripped as thoroughly as possible from the starch contained in it. The de-sizing operation according to this invention may be either effected in a separate step prior to scalding or simultaneously with the scalding step.

De-sizing has been effected by oxidizing the amylaceous substances with various oxidizing agents. Thus, it has been suggested to perform the de-sizing operation during the scalding step with the use of sodium chlorite as the starch oxidizing agent. Since chlorite has no effect on starch in alkaline media, the removal of the starch during a scouring operation which, precisely, must be conducted in an alkaline medium, is no better in its results than if the operation was conducted in the absence of the chlorite. It has, accordingly, been suggested more recently to carry out the chlorite de-sizing operation in an acid medium and in the presence of water vapor, which of course precludes operation simultaneously with the scouring step. The last mentioned method however has an advantage in that it permits continuous treatment, but the steaming operation is expensive and requires the use of special equipment.

One of us has found that the de-sizing of cellulose fabric can be performed in an especially satisfactory and inexpensive way, through oxidation in an alkaline medium, by means of alkali bromites. The use of such reagents results in a total removal of amylaceous substances even in very tight-woven fabrics, in a comparatively short time and operating at ordinary temperatures, while retaining all of the characteristics of the fabric unimpaired. The consumption of reagent is low. While the consumption depends on the reagent use, the following broad ranges may be mentioned by way of indication but not of limitation. For complete size removal from a heavy and tight woven fabric, very difficult to de-size by conventional methods and containing from 11 to 12% of size, the active bromine concentration in the reagent use according to the invention is only about 5 to 7 grams of active bromine per kilogram of dry material, if the de-sizing agent used is bromite, but about 40 grams active bromine if the agent is hypobromite. It will be recalled in this connection that the active bromine concentration in a solution is the sum total of the free bromine content, plus twice the bromine content of the hypobromite in the solution, plus four times the bromine content in the bromite in the solution. Lower reagent consumptions are of course obtained in the case of fabric that is lighter and/or contains a lower proportion of size than in the example above. It has been found that bromite is definitely more active than hypobromite and such a reagent will be preferably selected in connection with fabrics more difficult to de-size, such as poplin, whereas hypobromite on the other hand, while also suitable for this type of fabric, is preferred for use with fabrics easier to de-size such as calico.

In order to establish comparative data between the efficiency of the bromites of the invention such as sodium bromites, and that of sodium hypobromites and of known oxidizing agents, laboratory tests have been carried out on the one hand with oxygen compounds of bromine (sodium hypobromite and bromite) and on the other hand with the corresponding oxygen compounds of chlorine (sodium hypochlorite and chlorite). The table below sums up the results of these tests. All the tests were effected using test samples of a poplin weighing about 190 grams per square meter and containing about 11.5% size. The elimination of the starch is tested on completion of the treatment, by the iodine testing method, wherein change in color of the sample from blue to yellow indicates that the starch present has disappeared.

| Reagent | Temperature, degrees | pH | grams active Br or Cl used per 50 g. fabric (bath volume 1 liter) | grams active Br or Cl consumed per 50 g. fabric | Time, minutes | Color after iodine test |
|---|---|---|---|---|---|---|
| NaBrO | 20 | 9–10 | 3 | 2 | 80 | yellow. |
| NaBrO$_2$ | 20 | 9–10 | 1 | 0.5 | 80 | Do. |
|  | 20 | 9–10 | 2 | 0.25 | 15 | Do. |
| NaClO | 20 | 9–10 | 4 | 1.5 | 80 | blue. |
|  | 50 | 9–10 | 4 | 3 | 80 | light blue. |
| NaClO$_2$ | 20 | 9–10 | 4 | 0 | 80 | blue. |
|  | 80 | 8 | 4 | 0 | 80 | Do. |
|  | 80 | 4–5 | 3 | 0.3 | 80 | Do. |

The test results in the above table may be summarized by the statement that at ordinary temperature (20° C.) only sodium hypobromite and bromite are effective, though to different extents.

The table further shows that:

(a) The much more efficient reagent bromite can be used in a much more dilute solution and acts faster with a lower reagent consumption.

(b) Sodium hypochlorite has some action at about 50° C., but the tests show that twice as much reagent is then consumed even though the desired result is not attained.

(c) The chlorite is totally ineffective in an alkaline medium, while under the more severe conditions of an acid medium (pH 4 to 5) its action on starch is very slight, at 80° C.

The following point may further be noted concerning the compared actions of oxygen derivatives of bromine and chlorine as size-removers. Bromine derivatives are both active, with the bromite however definitely more potent than the hypobromite. As concerns chlorine derivatives on the other hand, the comparative efficiencies are reversed, i.e. the limited action of the hypochlorite is markedly greater than that of the chlorite.

In carrying out this feature of our invention in practice, solutions of alkali bromite are used, obtained in any appropriate way. The solutions may contain a certain quantity of foreign ions without impairing the de-sizing action. Thus, the presence of alkali metal hypobromites, bromides and bromates, even in comparatively high amounts, is not objectionable.

For example, solutions containing sodium bromite or a mixture of sodium bromite and sodium hypobromite, as prepared by the method described hereinbefore, the solutions being adjusted to the desired bromine concentration before use, are particularly suitable for the purposes of the present invention. It is quite practicable to add to de-sizing solutions containing bromite and eventually some hypobromite according to the invention, suitable proportions of oxidation-resistant wetting agents in order to promote rapid penetration into the fabric.

The de-sizing operation is performed in an alkaline medium, with the initial pH of the solution being preferably within an approximate range of from 9 to 10.5. The appropriate pH conditions may be obtained, for example, by adding soda. The addition of a buffer, while feasible, is not essential since a slight drop in pH during the operation is not objectionable. As a general rule, however, the operating conditions should be maintained such that, throughout the operation, the pH will not drop to such an extent as to cause a formation of free bromine which would attack the cellulose material and would impair the characteristics of the fabric.

The time of treatment will depend, for a given type of fabric, on the concentration of reagent in the solution. A quick pass of the fabric through a more concentrated solution makes it possible to obtain a more efficient de-sizing operation than is obtained with a longer dwell in less concentrated solutions. The results indicated in the table given above show, for example, that full size removal is obtained within 80 minutes when using a bromite solution containing 1 gram active bromine per liter, and within 15 minutes with a solution containing 2 grams active bromine per liter.

The above data result from laboratory tests and hence their value is comparative rather than absolute. Thus, for a given fabric treated under comparable conditions, the indicated data clearly show the wide range over which the two interdependent factors, time and reagent concentration, may be varied without impairing the final result. This feature is an outstanding advantage of the de-sizing process using bromites according to the present invention since the process is thus seen to possess high flexibility for performance on a commercial scale and may be carried out by the use of various procedures and with various types of plant.

An extremely advantageous form of the invention is to apply the so-called pressing or fulling process. In this process the material is passed at a very high rate (e.g. 30 to 40 meters per minute) through a bath of the solution, and is pressed at the outlet from the bath between two presser rollers. Since the fabric dwells for only a very short time in the reagent bath in this process, highly concentrated solutions are generally used.

Satisfactory results have been obtained when treating, for instance, poplin stock with solutions wherein the concentration of active bromine is 5 grams (or less) per liter in the form of bromite.

One outstanding advantage of the invention is to permit continuous de-sizing treatment under extremely economical conditions. Owing to the use of reagents efficient at ordinary temperature, the fulling method just mentioned, which was inapplicable in conjunction with the de-sizing methods conventionally used heretofore, becomes feasible and may be applied without any additional operations. This procedure in particular avoids having to apply a steaming step as is required where the oxidizer used was sodium chlorite or the like.

As compared to known de-sizing processes using acids and enzymes, the above-described use of alkali metal bromites produced according to the invention has important advantages. Operation at ambient temperature considerably simplifies the necessary plant and lowers the over-all cost of the de-sizing operation. The operating time is considerably reduced. After a treatment not exceeding one hour, the fabric is in a condition to be subjected to the subsequent treatments without necessitating many hours of intermediate storage. Irregular de-sizing due to nonuniform temperature during storage is also avoided in this way.

The use of bromite alone or with hypobromite has manifest advantages when the de-sizing operation is conducted as a preliminary stage preceding the remaining textile processing operations. The use of bromite has yet another important advantage. It has been found that bromite is stable in alkaline media at elevated temperatures and constitutes a highly efficient starch-oxidizing agent at temperatures definitely higher than ambient temperature even in highly alkaline media. Consequently, the de-sizing may be effected by means of bromite during the scalding operation, thus eliminating one stage of treatment. In such a procedure, it is simply necessary to add to the conventional scouring bath, usually comprising a solution of soda and sodium carbonate, a relatively small amount of alkali bromite, particularly sodium bromite. As was the case for de-sizing at ordinary temperature, the amount of bromite to be used depends of course on the textile stock being treated. For example, it has been found that satisfactory results are obtained when treating a very tightly woven and heavily sized poplin in a scouring bath containing less than 1 gram per liter of active bromine per liter in the form of bromite (about 5 grams active bromine per kilogram fabric). The scouring step is performed in any of the conventional apparatus used for this purpose, and satisfactory results are obtained at the end of two hours treatment. Fabric thus treated is completely de-sized, has good hydrophilic characteristics and entirely satisfactory bleaching and dyeing characteristics.

It will be understood that the procedures described above were given as examples only, and that solutions containing bromite alone or in mixture with hypobromite may be applied according to the new de-sizing process in connection with any of various other de-sizing processes without exceeding the scope of the invention. Similarly the bromite may be added to scouring baths of any specific composition without exceeding the scope of the invention.

The use of sodium bromite solutions in the above-described treatment of textile fabric will be further illustrated by a few non-limitative examples given hereinafter.

*Example XVI*

Poplin stock initially containing 12.2% size is treated with a water solution of sodium bromite containing 5 grams active bromine per liter, and 5 cc. per liter of a wetting agent of the aryl-alkylsulfonamine type. The initial pH of the solution is 9.8.

The fabric is fulled broadwise at ordinary temperature in the above solution and is taken up at the outlet from the fulling press. Two passes through the bath are effected at a rate of about 30 meters per minute. The squeezing or pressing ratio is about 50 to 55%.

After this treatment which constitutes the de-sizing process proper, the fabric is washed in a dilute soda solution (5 grams NaOH per liter) at about 90° C. and is then passed directly to the scouring step.

Samples of the fabric thus treated are tested for the percentage of residual size on the warp yarn and this is found to be zero. Further tests indicate the high-quality characteristics of the resulting fabric.

*Example XVII*

The fabric treated is the same as in Example XVI. The solution used contains 1 gram active bromine per liter in the form of sodium bromite. 5 cc. per liter of a wetting agent are added, of a type similar to that used in Example XVI. Solution pH is 9.7.

The fabric is treated in a jigger at ordinary temperature for 60 minutes by passing the fabric through the bath, provided in an amount of 10 liters solution per kilogram of fabric. The fabric is then washed in dilute soda solution as in Example XVI.

On analyzing the treating solution after the process, it was found that 2.5 grams active bromine had been used up per kilogram of the fabric. The starch was completely eliminated and the characteristics of the fabric were preserved.

*Example XVIII*

Calico containing about 8% size is treated in a jigger, with a solution containing 0.5 gram active bromine per liter, of which 43% are in the form of sodium hypobromite and 57% in the form of sodium bromite. The initial pH of the solution is 9.9. A wetting agent comprising a sodium salt and butylricinoleic ester sulfonate is added to this solution in an amount of 5 grams per liter to promote penetration of the reagent.

At the end of 60 minutes treating time at about 20° C. in the above solution the material is washed in a heated soda solution containing 5 grams per liter.

Iodine test shows the starch was completely removed and the characteristics of the fabric entirely unimpaired.

*Example XIX*

Poplin containing 12.2% size similar to that in Example XVI is treated in a scouring bath comprising a solution containing 15 g./l. NaOH, 15 g./l. $Na_2CO_3$ and 0.5 g./l. active bromine as sodium bromite. About 5 liters of this solution per kilogram fabric were used and the fabric was boiled for two hours while maintaining constant volume.

The fabric is then washed in hot water and then rinsed in cold running water. The amount of residual size is determined in a sample of the treated fabric and the size is found to be completely eliminated. Tests show that the fabric has good hydrophilic properties and the other characteristics are retained.

It will be understood that this invention is susceptible to further modification and, accordingly, it is desired to comprehend such modifications within this invention as may fall within the scope of the appended claims.

We claim:

1. In the method of producing alkaline earth metal bromite, selected from the group consisting of barium and strontium bromite, the steps, in combination, of preparing a starting suspension of solid hypobromite of the said alkaline earth metal in a saturated aqueous solution of said hypobromite, and further processing the suspension by adjusting the initial pH of the aqueous hypobromite solution to a pH of at least about 10 so as to start spontaneous conversion of the hypobromite to the corresponding bromite; maintaining the operating temperature of the solution below that temperature at which the bromite would be decomposed until obtaining a primary solution containing bromite and hypobromite, wherein the conversion of hypobromite to bromite has approximately attained a maximum value for the respective pH and temperature; and adding to the primary solution a metal hydroxide in such amounts as to raise the pH of the solution to at least 12.9, so as to stop the conversion of hypobromite to bromite at the aforesaid maximum, and simultaneously stabilize the resulting solution.

2. A method of producing solid, crystalline barium bromite from barium hypobromite, which comprises
   (a) preparing an aqueous suspension of barium hypobromite, in such amounts that the suspension contains at least 20 grams of barium hypobromite per 100 grams of suspension,
   (b) adjusting the initial pH of the aqueous barium hypobromite solution to a pH of between about 10.5 and 11.5 so as to start spontaneous conversion of the barium hypobromite to barium bromite,
   (c) maintaining the operating temperature of the suspension in the vicinity of 0° C., until obtaining a primary suspension of precipitated barium bromite in a solution containing barium bromite and barium hypobromite, wherein the conversion of the hypobromite to the bromite has about attained a maximum value for the respective pH at the aforesaid temperature,
   (d) adding to the primary suspension barium hydroxide in such amounts as to raise the pH of the solution to at least 12.9, so as to stop the conversion of barium hypobromite to barium bromite at the aforesaid maximum, and simultaneously stabilize the resulting secondary bromite-containing suspension,
   (e) separating the resulting precipitated barium bromite from the mother liquor, and
   (f) recrystallizing the crude precipitate to obtain a salt containing about 98% of $Ba(BrO_2)_2.H_2O$.

3. A method as described in claim 2, characterized in that the barium hydroxide added under step (d) is in the form of solid barium hydroxide.

4. A method of producing solid, crystalline barium bromite from barium hypobromite, which comprises
   (a) preparing an aqueous suspension of barium hypobromite, in such amounts that the suspension contains at least 20 grams of barium hypobromite per 100 grams of suspension,
   (b) adjusting the initial pH of the aqueous barium hypobromite solution to a pH of between about 10.5 and 11.5 so as to start spontaneous conversion of the barium hypobromite to barium bromite,
   (c) maintaining the operating temperature of the suspension in the vicinity of 0° C., until obtaining a primary suspension of precipitated barium bromite in a solution containing barium bromite and barium hypobromite, wherein the conversion of the hypobromite to the bromite has about attained a maximum value for the respective pH at the aforesaid temperature,
   (d) adding to the primary suspension barium hydroxide in such amounts as to raise the pH of the solution to at least 12.9, so as to stop the conversion of barium hypobromite to barium bromite at the aforesaid maximum, and simultaneously stabilize the resulting secondary bromite-containing suspension, and
   (e) separating the resulting precipitated barium bromite from the mother liquor.

References Cited in the file of this patent

UNITED STATES PATENTS

| 2,253,242 | MacMahon et al. | Aug. 19, 1941 |

FOREIGN PATENTS

| 574,614 | Canada | Apr. 21, 1959 |
| 221,140 | Australia | Apr. 10, 1959 |

OTHER REFERENCES

Radley: Manufacturing Chemist and Manufacturing Perfumer, pages 158–166 (July 1942).

Mellor: Comprehensive Treatise on Inorganic and Theoretical Chemistry, Supplement II, part 1, page 753 (1956), Longmans, Green & Co., N.Y.; and vol. 2, pages 255–256 (1922).

Richards: Journ. of the Soc. of the Chemical Industry, vol. 25, pages 5 and 6 (Jan. 15, 1906), "The Existence of Bromous Acid ($HBrO_2$)."

Clarens: Article in Compten Rendu, vol. 157, page 217 (1913).

Chemical Abstracts, vol. 33, page 2431, Josien, "Formation of Bromous Acid by Action of $Br_2$ on Silver Nitrate," published 1949; and vol 42, page 7188, Sourisseau, "Formation of $HBrO_2$ in Silver Salt Solutions of $Br_2$," published 1948.

Journal of Amer. Chem. Soc., vol. 76, pages 2010–15, Engle et al., "The Decomposition of Hypobromite and Bromite Solutions," published 1954.